(12) United States Patent
Boguess (10) Patent No.: US 12,222,327 B2
(45) Date of Patent: Feb. 11, 2025

(54) DEVICES, SYSTEMS, AND METHODS FOR INSTALLING AND LOAD TESTING EARTH ANCHOR FOUNDATIONS (71) Applicant: Brian C. Boguess, Santa Monica, CA (US)

(72) Inventor: Brian C. Boguess, Santa Monica, CA (US)

( * ) Notice: Subject to any disclaimer, the term of this patent is extended or adjusted under 35 U.S.C. 154(b) by 630 days.

(21) Appl. No.: 17/394,263

(22) Filed: Aug. 4, 2021

(65) Prior Publication Data

US 2022/0042890 A1 Feb. 10, 2022

Related U.S. Application Data

(60) Provisional application No. 63/061,733, filed on Aug. 5, 2020.

(51) Int. Cl.
*G01N 3/02* (2006.01)
*E02D 33/00* (2006.01)
*G01N 3/08* (2006.01)
*G01S 19/14* (2010.01)
*E02D 7/00* (2006.01)

(52) U.S. Cl.
CPC .............. *G01N 3/08* (2013.01); *E02D 33/00* (2013.01); *G01N 3/02* (2013.01); *G01S 19/14* (2013.01); *E02D 7/00* (2013.01)

(58) Field of Classification Search
CPC .......... E02D 33/00; E02D 27/42; E02D 7/22; E02D 7/06; E02D 27/50; E02D 5/801; E02D 27/32; H02S 20/10; H02S 30/10; F24S 25/12; E04H 12/10; E04H 6/025; E04B 1/34352; B63B 21/50; B63B 21/502; G01N 3/08; B66C 1/666; E01D 21/00; F16L 1/028
See application file for complete search history.

(56) References Cited

U.S. PATENT DOCUMENTS

| 7,611,129 | B1 * | 11/2009 | Stahm | E02D 33/00 254/263 |
| 9,360,397 | B1 * | 6/2016 | Melton | G01M 99/007 |
| 2013/0098165 | A1 * | 4/2013 | Bruce | E02D 5/80 73/828 |

* cited by examiner

*Primary Examiner* — Brandi N Hopkins
(74) *Attorney, Agent, or Firm* — William A. English; VISTA IP LAW GROUP LLP (57) ABSTRACT

Devices, systems, and methods for installing earth anchor foundations and/or conducting load tension tests on earth anchors used to secure structures, such as solar platforms, trellises, tents, decking, bleachers, telephone poles, powerlines, construction scaffolding, and the like. In one example, the device includes a base plate, a plurality of elongate telescoping members extending from the base plate and containing a crank mechanism. A drive shaft on the upper member is coupled to the crank mechanism to raise and lower the upper member relative to the base plate. A support arm or shelf is provided on the upper member for raising a frame during installation of the structure, and a testing hook is provided on the upper member for conducting a load tension test on one or more earth anchors used to secure the structure using a load measurement device coupled to the hook and the earth anchor(s).

20 Claims, 8 Drawing Sheets

DEVICES, SYSTEMS, AND METHODS FOR INSTALLING AND LOAD TESTING EARTH ANCHOR FOUNDATIONS

RELATED APPLICATION DATA

The present application claims benefit of co-pending U.S. provisional application Ser. No. 63/061,733, filed Aug. 5, 2020, the entire disclosure of which is expressly incorporated by reference herein.

FIELD OF THE INVENTION

The present application relates to structures using a surface-mount installation to secure the structures, and, more particularly, to devices, systems, and methods for installing earth anchor foundations and/or conducting load tension tests on earth anchors used to secure structures, such as solar racking solutions, solar platforms, trellises, tents, decking, bleachers, telephone poles, powerlines, construction scaffolding, orchard trellising solutions, erosion control, slope stability, geomembrane anchoring, tree anchoring, concrete form fencing, embankments, slope reinforcement and soil retention channels, riverbanks, lakes and spillways, seismic anchor bracing, and the like.

BACKGROUND

It is well known that alternative renewable energy resources are proven to be an important element in an overall energy plan for the off taker. Cost savings initiatives and a renewable and sustainable clean energy solution to lower the cost of energy (LCOE), is a critical factor as the cost of carbon based fuels and other fossil fuels are costly to use and continue to increase cost over time and these fossil fuels harm the environment and impact climate change. Grid parity has finally been achieved in not just large utility scale solar power plant installation, but also in commercial and residential distributed generation (DG) and load side of the meter renewable energy applications. Solar (PV) energy, and energy storage systems (ESS) help recipients of this clean, renewable energy to load shift away from high rate tariffs and demand charges or be totally independent of the electrical grid. In order to produce sufficient usable and reusable clean energy from the sun, it is necessary to place one or more solar arrays in areas where they can capture the most solar radiation.

Conventional foundations, which use antiquated methods and support structures required to install such solar arrays hosting one or more solar panels and generally involve the following: pre-development and engineering, geotechnical reports, soil sampling, environmental impact studies and multiple inspections from local authority holding jurisdiction (AHJ) during the installation process. Predevelopment geotechnical reports can take many weeks to months that add cost and time and logistic in order to determine soil conditions taken from the data collected, which determine the structural engineering calculations required for supporting structures. Conventional foundations also require site planning, grading, mobilization of (non-locally sourced) components and resources, heavy equipment, and need a technically skilled labor force certified to operate such heavy equipment, which are not typically local either. Conventional foundations and methods of installation may use ballasted concrete blocks or non-locally sourced cement for concrete pour in place cement piers. Conventional foundations and methods take substantial procurement time and cost, installation time and cost, particularly for I beam steel piles, or helical ground screw foundations used for surface mounted solar arrays, and involve substantial earth and project site disruption. All these things substantially impact the local environmental and are not a sustainable method for installation of solar structures.

Therefore, improved solar power platforms, support structures and foundations for solar arrays and new methods used for installing and/or using them would be very useful, more economical and efficient and most beneficial to the local environment.

SUMMARY

The present application is directed to structures using a surface-mount installation to secure the structures, and, more particularly, to devices, systems, and methods for installing and/or conducting load tension tests on earth anchors used to secure structures, such as solar platforms, trellises, tents, decking, bleachers, telephone poles, powerlines, construction scaffolding, orchard trellising solutions, erosion control, slope stability, geomembrane anchoring, tree anchoring, concrete form fencing, embankments, slope reinforcement and soil retention channels, riverbanks, lakes and spillways, seismic anchor bracing, and the like.

The devices, systems, and methods herein may facilitate installation of structures, such as solar array platforms hosting one or more solar panels, that include a support frame and a plurality of support legs including shoe plates. Such structures may be installed using one or more toggle earth anchors, e.g., with rod and/or cable, as an anchoring foundation, which may eliminate the need for costly and time sensitive pre-development geotechnical reports, site preparation and grading, environmental impact studies, and multiple traditional permit inspection requirements on site during construction by local AHJ.

The devices, systems, and methods herein may also facilitate performing real-time soil condition, field vertical and lateral load lift (dynamic and static tension) tests, e.g., up to 8,000 lbs., e.g., including wind and seismic load requirements, e.g., conducted during real time installation of solar platforms to pass geotechnical and structural engineering specifications and local AHJ permitting, and/or to measure the load tension results of the toggle anchor with rod and/or cable to assure compliance requirements are achieved with applicable local building codes and regulations. A load tension test conducted in a "real time soil conditions" versus a calculation of those soil conditions as measured during a pre development geotechnical report is the preferred method for a local AHJ.

In one example, a device is provided for installing and/or testing an earth anchor that includes a base plate defining an upper surface; an elongate first member including a lower end mounted to the base plate along an axis extending from the upper surface; an elongate second member movably mounted to the first member along the axis; an actuator on the second member coupled to a mechanism inside one or both of the first and second members to selectively move the second member along the axis towards or away from the base plate; a support arm extending from the second member substantially perpendicular to the axis; and a testing hook on the second member for conducting a load tension test on an earth anchor coupled to the hook.

In another example, a system is provided for conducting a load tension test on one or more earth anchors used to secure a structure that includes a load tension device comprising a base plate defining an upper surface, an elongate first member including a lower end mounted to the base plate along an axis extending from the upper surface, an elongate second member movably mounted to the first member along the axis, an actuator on the second member coupled to a crank mechanism inside one or both of the first and second members to selectively move the second member along the axis towards or away from the base plate, and a testing hook on the second member for conducting a load tension test on an earth anchor coupled to the hook; and a load measuring device coupled to the hook, the load measuring device comprising a connector for coupling to an exposed end of an earth anchor installed into the ground to measure a tensile force application to the earth anchor when the actuator is activated to raise the second member and conduct a load tension test.

In yet another example, a method is provided for installing a structure that includes providing an installation device comprising a base plate defining an upper surface, an elongate first member including a lower end mounted to the base plate along an axis extending from the upper surface, an elongate second member movably mounted to the first member, an actuator on the second member coupled to a mechanism inside one or both of the first and second members to selectively move the second member along the axis towards or away from the base plate, a support arm extending from the second member substantially perpendicular to the axis, and a testing hook on the second member for conducting a load tension test on an earth anchor coupled to the hook. The method further includes placing the device on a shoe plate of a first leg of the structure such that the support arm is located under a support member of the support frame; actuating the actuator to raise the second member, thereby engaging the support member with the support arm and raising the support frame, thereby extending the first leg; once a desired height is achieved, securing the first leg to prevent further movement of the first leg; and removing the device.

In still another example, a method is provided for conducting a load tension test on one or more earth anchors used to secure a structure that includes providing an installation device comprising a base plate defining an upper surface, an elongate first member including a lower end mounted to the base plate along an axis extending from the upper surface, an elongate second member movably mounted to the first member along the axis, an actuator on the second member coupled to a mechanism inside one or both of the first and second members to selectively move the second member along the axis towards or away from the base plate, and a testing hook on the second member for conducting a load tension test on an earth anchor coupled to the hook. The method further includes installing an earth anchor into the ground adjacent a first leg such that an exposed end of an elongate member coupled to anchor is located adjacent the shoe plate; placing the device on a shoe plate of the first leg; coupling the exposed end to the hook; actuating the actuator to raise the second member to apply a desired tensile force between the exposed end and the anchor and conduct a load lift (tension) test; removing the device; and securing the exposed end to one or both of the first leg and the shoe plate to secure the support frame relative to the ground at the installation site.

Other aspects and features will become apparent from consideration of the following description taken in conjunction with the accompanying drawings.

BRIEF DESCRIPTION OF THE DRAWINGS

The present invention is best understood from the following detailed description when read in conjunction with the accompanying drawings. It will be appreciated that the exemplary devices shown in the drawings are not necessarily drawn to scale, with emphasis instead being placed on illustrating the various aspects and features of the illustrated examples.

DETAILED DESCRIPTION

Before examples are described, it is to be understood that the invention is not limited to particular examples described, as such may, of course, vary. It is also to be understood that the terminology used herein is for the purpose of describing particular examples only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials are now described.

It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Turning to the drawings, FIGS. 1A-1D show an example of a device 10 for installing and/or conducting load tension tests on earth anchors used to secure a structure (not shown). As described herein, the devices may be used to install and/or test earth anchors used for surface-mount installations to secure a variety of structures, such as solar platforms, trellises, tents, decking, bleachers, telephone poles, powerlines, construction scaffolding, orchard trellising solutions, erosion control, slope stability, geomembrane anchoring, tree anchoring, concrete form fencing, embankments, slope reinforcement and soil retention channels, riverbanks, lakes and spillways, seismic anchor bracing, and the like. For example, the devices herein may be used to perform load tests on earth anchors used for securing solar panel platforms, such as those disclosed in U.S. Pat. No. 10,622,938, and International Publication No. WO 2019/246165, the entire disclosures of which are expressly incorporated by reference herein.

Figure 1A:
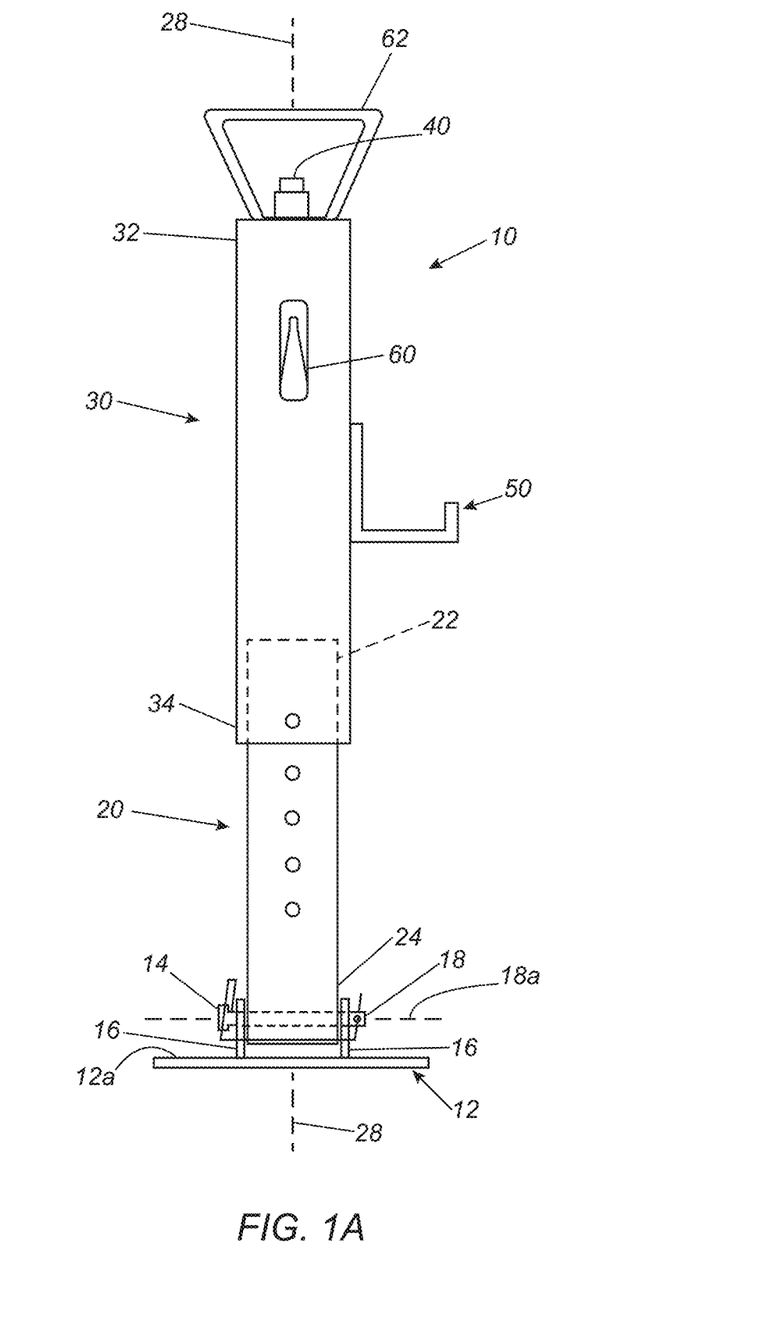
FIGS. 1A-1D shown an example of a portable, handheld, load tension testing device, e.g., for installing and/or testing earth anchors used for surface-mount installations to secure a structure.
Figure 1B:
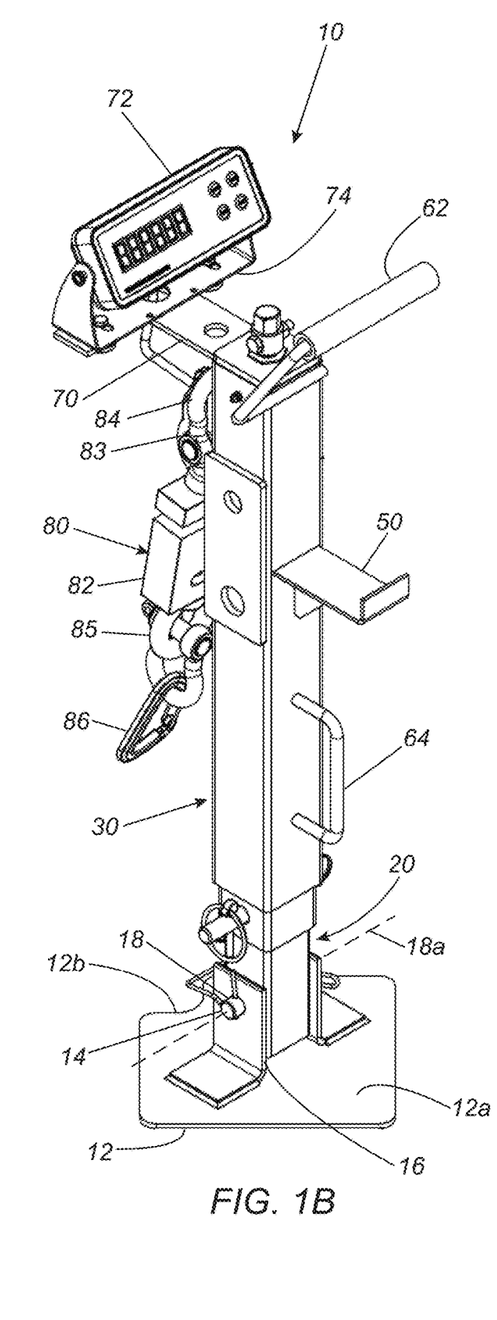
Figure 1C:
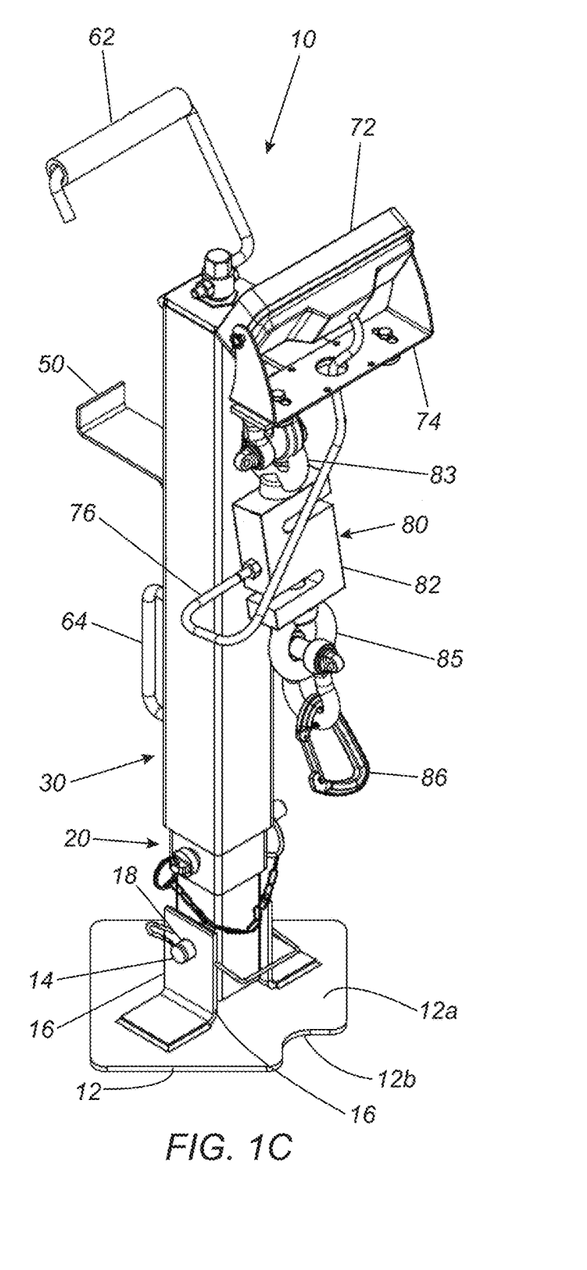
Figure 1D:
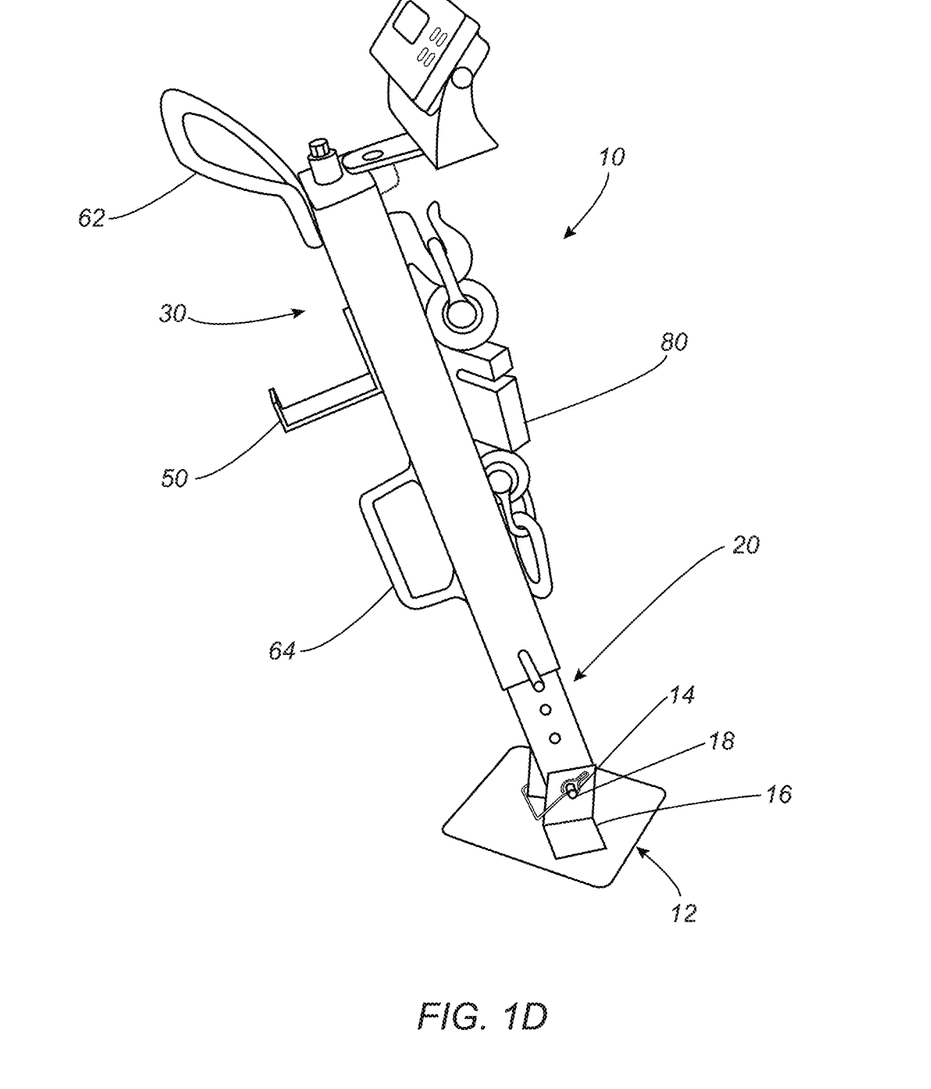

Generally, as shown, the device 10 includes a base plate 12, a plurality of elongate telescoping or otherwise movable tube members, e.g., including a first or lower member 20 and a second or upper member 30, extending from the base plate 12 and containing a mechanism coupled between the elongate members 20, 30 (not shown), and a drive shaft or other actuator 40 on the upper member 30 coupled to the crank mechanism. In addition, the device 10 may include one or more components attached to one or both of the elongate members 20, 30, such as a support arm or shelf 50, a testing hook 60, and/or a mount 70, e.g., on the upper member 30. Optionally, the device 10 may include one or more handles, e.g., a first handle 62 secured at an upper end 32 of the upper member 30, as shown in FIG. 1A, and/or a second handle 64 on a sidewall of the upper member 30, e.g., as shown in FIGS. 1B-1D. For example, the support arm 50, hook 60, mount 70, and handle(s) 62, 64 may be permanently attached to the upper member 30, e.g., using one or more of welding, bonding, one or more fasteners (not shown), and the like, to provide a structure capable of supporting desired loads during the installation. For example, the support arm 50, members 20, 30, crank mechanism, and other components of the device 10 may be capable of supporting and/or lifting structures weighing up to eight thousand pounds (8,000 lbs.) dynamic load and five thousand pounds (5,000 lbs.) static loads.

Figure 2A:
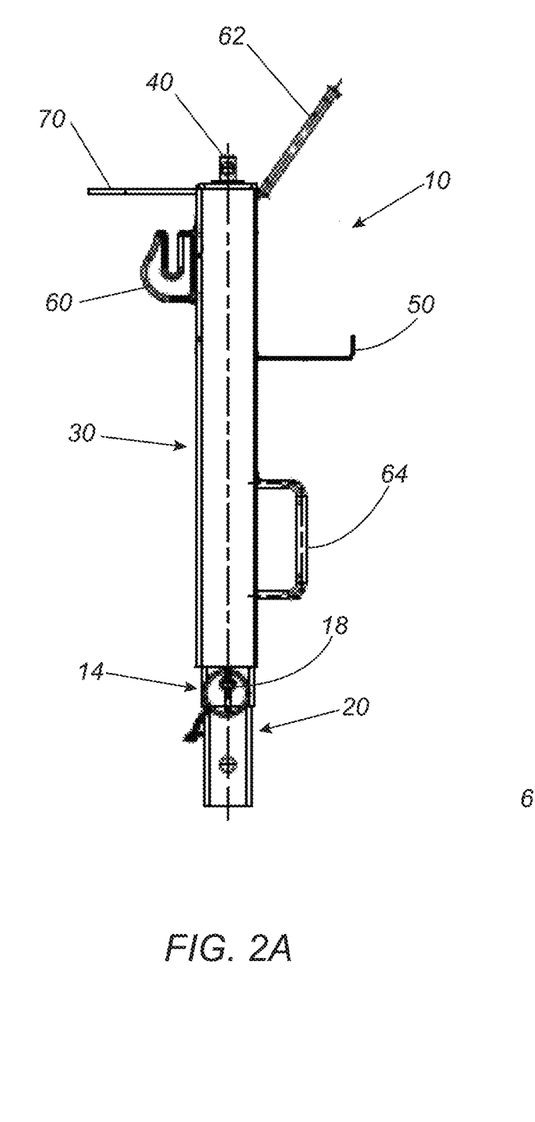
FIGS. 2A and 2B are side and perspective views of tubular members that may be included in the device of FIGS. 1A-1D.
Figure 2B:
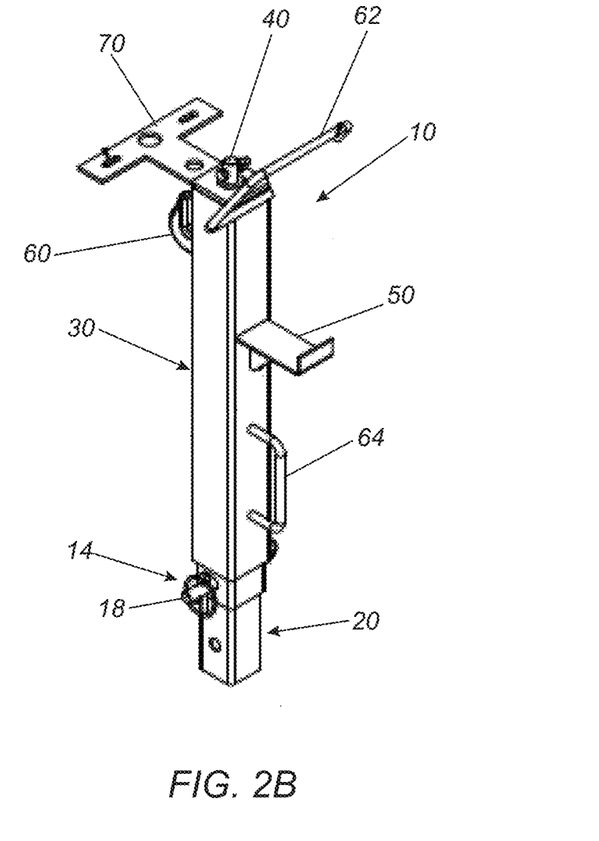
Figure 2C:
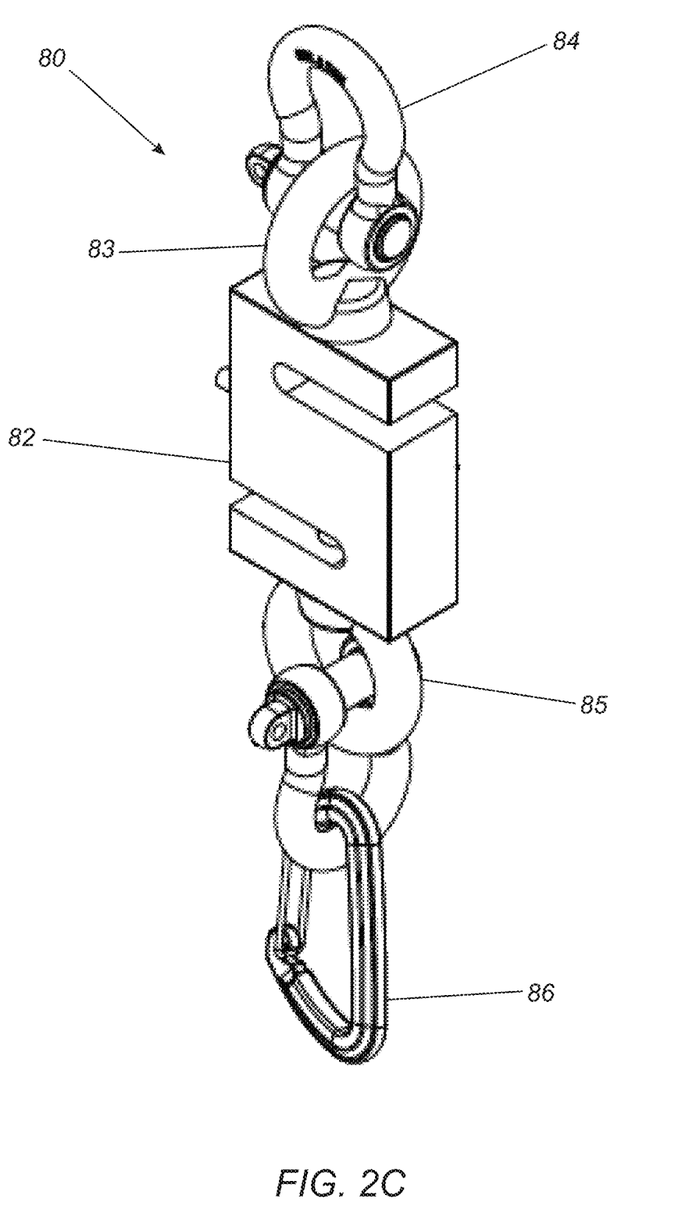
FIG. 2C shows an example of a load measuring device including an S-beam load cell and connectors that may be connected to the device of FIGS. 1A-1D.

In addition or alternatively, the device 10 may include a load measuring device 80, e.g., as best seen in FIGS. 1C and 2C, connectable to the hook 60 or integrated into the device 10. In the example shown, the load measuring device 80 includes an S-beam load cell 82 including a first eyebolt 83 on a first or upper end coupled to a shackle 84 or other a connector for connecting the load cell 82 to the hook 60, and a second eyebolt 85 for coupling to an exposed end of an earth anchor (not shown). e.g., using a carabiner 86 or other connector. Thus, in this example, the load measuring device 80 may be removably coupled to the hook 60 and/or otherwise connected to the device 10 to perform a load tension test on an earth anchor. Alternatively, the load measuring device may be permanently attached to or otherwise integrated into the device (not shown).

Figure 3A:
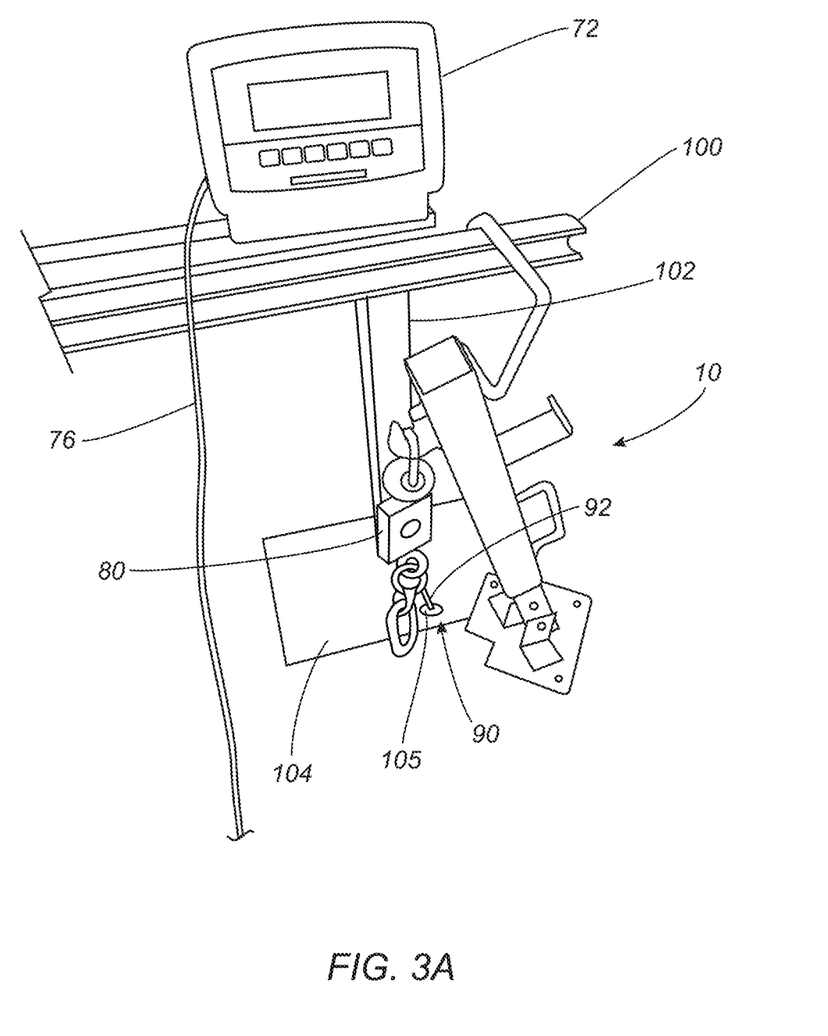
FIGS. 3A-3C show various views of the device of FIGS. 1A-1D being used to perform a load tension test on an earth anchor.
Figure 3B:
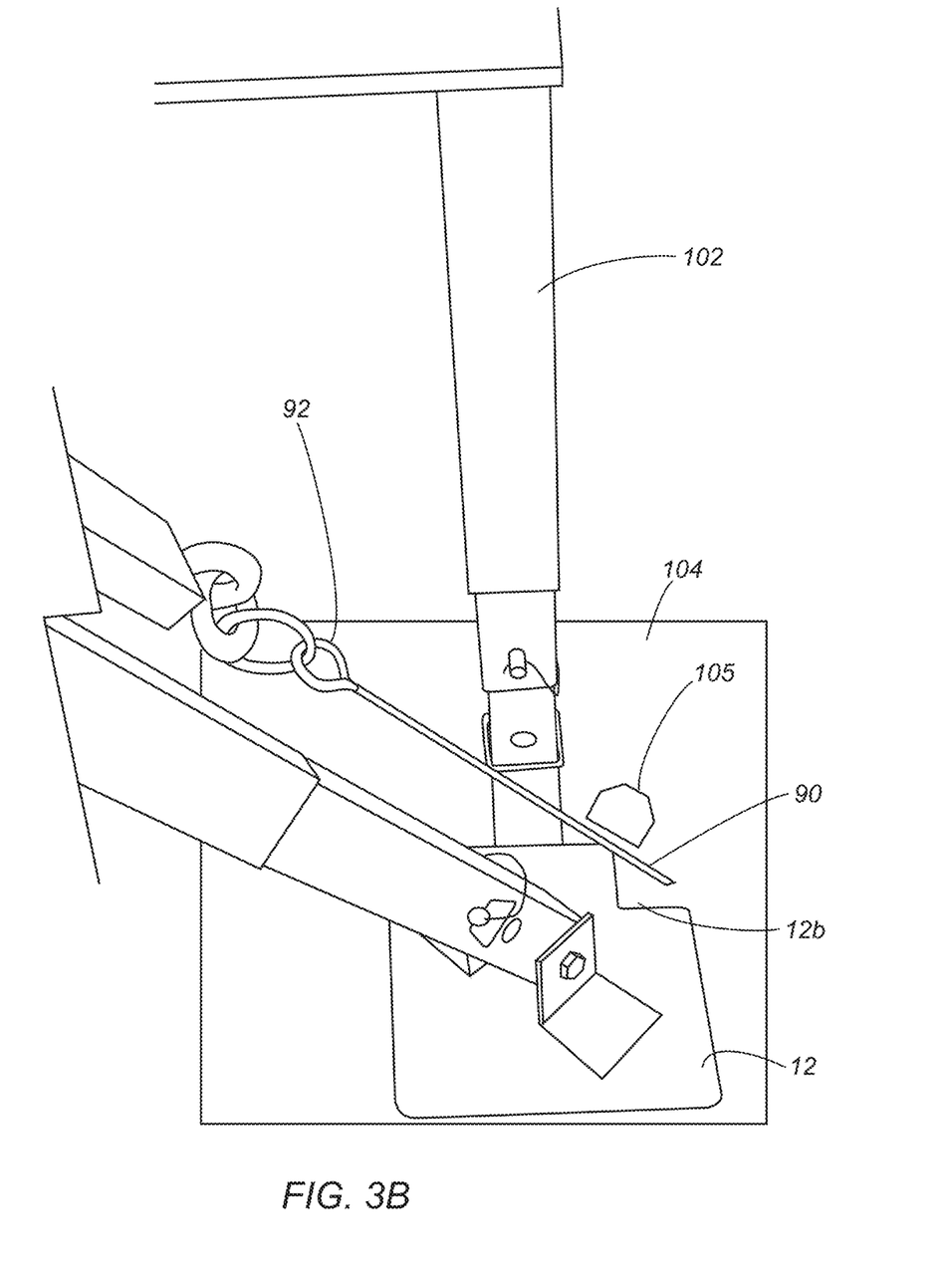
Figure 3C:
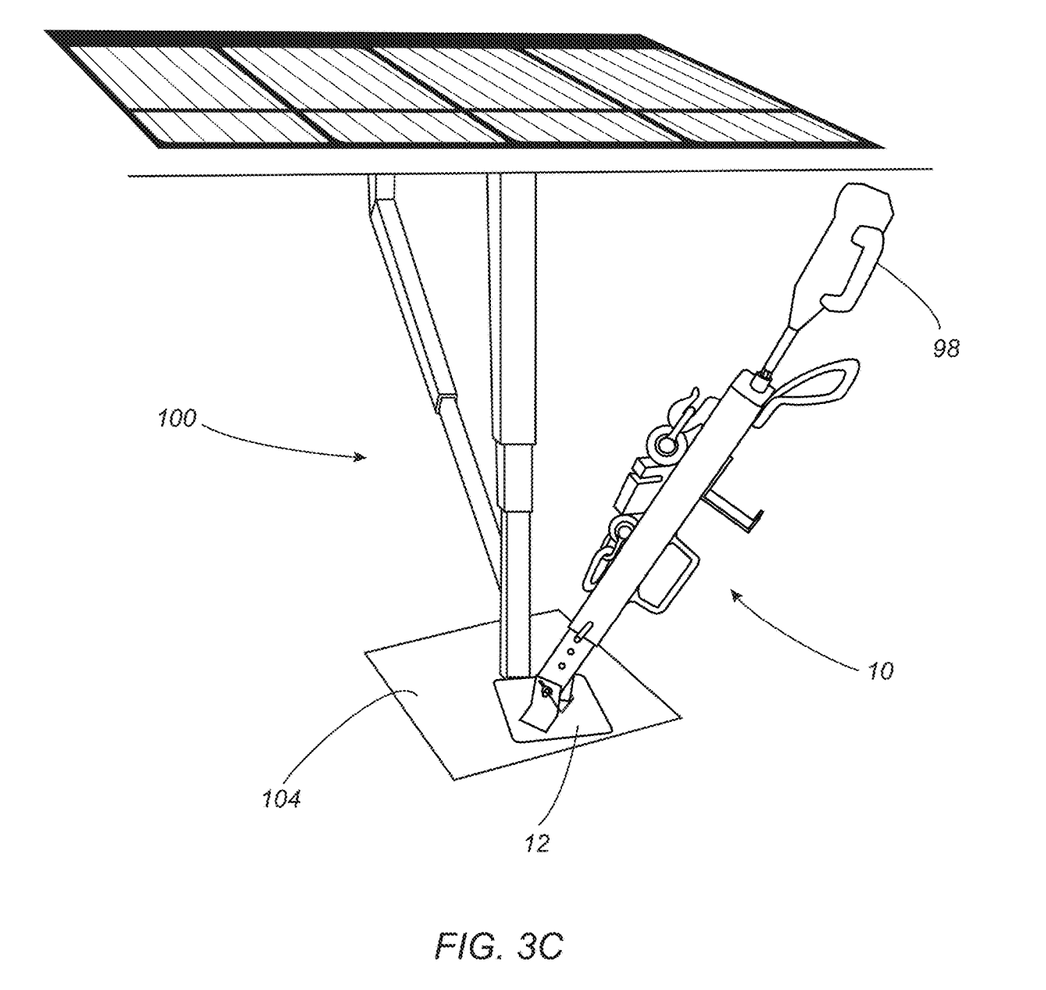

For example, as described elsewhere herein with reference to FIGS. 3A-3C and in the publications incorporated by reference herein, an earth anchor 90 may be installed into the ground adjacent to a structure 100 being secured to measure a tensile force application (e.g. dynamic load or static load) to the earth anchor 90, e.g., by rotating the drive shaft 40 or other actuator to raise the second member 30 relative to the lower member 20, e.g., to conduct a load tension test. Optionally, the device 10 may also include a hand crank or a motorized mechanism (not shown) connectable to the drive shaft 40 or integrated into the device for rotating the drive shaft 40. For example, as shown in FIG. 3C, a power drill or other tool 98 may be coupled to the drive shaft 40, e.g., which may include a hexagonal or other shaped connector (not shown) configured to engage a corresponding fitting on the tool, and the drive shaft 40 rotated to cause the internal crank mechanism to raise the upper member 30 relative to the base plate 12.

In the example shown in FIGS. 2A and 2B, the device 10 includes first and second elongate members 20, 30 formed from steel tubing, e.g., square tubing as shown, although alternatively, round or other shapes of tubing may be used as long as the members are sized to telescope and/or otherwise slide axially relative to one another and have sufficient column strength to support the device 10 during use. For example, as shown, an upper end 22 of the lower member 20 is slidably received within a lower end 34 of the upper member 30 such that the upper member 30 may move up and down along a longitudinal axis 28 over at least a portion of the lower member 20. Optionally, a third or additional elongate members (not shown) may be provided, e.g., slidably coupled between the upper and lower member 30, 20, if desired to provide additional range of motion for the upper member 30. The crank mechanism may include one more shafts, gears, and/or other components (not shown) within the interior of the upper and/or lower members 30, 20 to control movement of the upper member 30 relative to the lower member 20.

In one example, a lower end 24 of the lower member 20 may be fixedly attached to the base plate 12, e.g., such that the axis 28 is substantially perpendicular to the upper surface 12a of the base plate 12. Alternatively, the lower member 20 may be movable relative to the base plate 12 to change an angle and/or other orientation of the elongate members 20, 30 relative to the base plate 12. For example, as shown in FIGS. 1D and 3C, the lower end 24 of the lower member 20 may be connected to the base plate 12 by a hinge 14 such that the axis 28 may be pivoted diagonally relative to the base plate 12. For example, as best seen in FIGS. 1B and 1C, the base plate 12 may include "L" brackets or other supports 16 mounted to the upper surface 12a, e.g., including one or more holes, and the lower end 24 of the lower member 20 may be coupled to the brackets 16 using a pin 18 received in the holes to allow the lower member 20 to rotate about a pin axis 18a relative to the base plate 12. Alternatively, the base plate 12 may include a stem or other structure (not shown) extending from the upper surface 12a, and the lower end 24 of the lower member 20 may be connected to the stem by the hinge. Optionally, the lower member 20 and/or base plate 12 may include a locking mechanism (not shown) to secure the lower member 20 at a desired angle.

With additional reference to FIGS. 1B and 1C, the device 10 may also include an output device, e.g., a display 72 mounted to the upper member 30, which may be coupled to the load measuring device 80 to present information to the operator during a test. For example, as best seen in FIGS. 2A and 2B, the mount 70 may be a horizontal plate mounted to the upper end 32 of the upper member 30, thereby providing a surface for supporting the display 72. The display 72 may be removably secured or otherwise placed on the mount 70, e.g., using cooperating connectors, e.g., magnets, fasteners, and the like.

In the example shown, the display 72 includes a support frame 74 that may be removably secured to the mount 70, thereby allowing the display 72 to be secured but pivotable relative to the frame 74, which may facilitate an operator monitoring the display 72 during a test. The load cell 82 may be coupled to the display 72 by a cable 76 such that signals from the load cell sensors within the load cell housing may be processed by a processor (not shown) in the display 72, which may process the signals and then display readings of relevant data, e.g., the tensile force being applied to an earth anchor during a test. Alternatively, the sensor housing and output device may communicate wirelessly, e.g., using Bluetooth or other RF or short range transmitters and/or receivers.

In a further alternative, the output device 72 maybe portable, e.g., such that the output device 72 may be placed on or removably coupled to a frame or other structure to which an earth anchor is to be coupled, e.g., as shown in FIG. 3A. Thus, the output device 72 may be positioned at any convenient location to facilitate visually monitoring the output of the tensile force being applied during a load tension test.

As can be seen from the description herein, the device 10 may provide a portable and/or handheld apparatus for conducting tensile load tests on earth anchors and/or other supports connected to the device 60. For example, the device 10 may simply be carried using the central handle 64 provided on the side of the upper member 30, e.g., without the load measuring device 80 and/or display 72, which may be carried separately and connected to the device 10 at each test location. Alternatively, the load measuring device 80 and display 72 may be secured to the device 10 and carried using the central handle 64 or by pulling the device 10 using the upper handle 62.

Alternatively, the device may be permanently or removably mounted to other pieces of equipment. For example, the base plate (or the lower end of the lower member) may be mounted to a frame of a tractor, ATV, trailer, or other vehicle (not shown) such that the vehicle may be driven to the location of each earth anchor being tested. For example, the device may be mounted on an auger system with forks provided on a vehicle (not shown), which can then be used to rapidly perform a series of tests on anchors installed at a site before securing a structure using the anchors.

Turning to FIGS. 3A-3C, in an exemplary application, the device 10 may be used to conduct a load tension test on one or more earth anchors used to mount a structure including a support frame 100 and a plurality of legs including shoe plates. For example, as shown, an earth anchor 90 may be installed into the ground adjacent a first leg 102 of the support frame 100 such that an exposed end 92 of an elongate member 94, e.g., a cable and/or rod, coupled to the anchor 90 is located adjacent 1 shoe plate 104 of the first leg 102, e.g., through a hole 105 in the shoe plate 104, as best seen in FIG. 3A. The base plate 12 of the device 10 may be placed on the shoe plate 104 of the first leg 102, and the exposed end 92 of the anchor 90 may be coupled to the hook 60. For example, the load measuring device 80, e.g., including the load cell 82 shown in FIG. 2C or another force measuring apparatus (not shown), may be connected to the hook 60, e.g., by the shackle 84 or other connector on an upper end of the load cell 82, and the exposed end 92 may be connected to the load cell 82, e.g., by hooking a loop on the exposed end 92 into the carabiner 86 on the lower end of the load cell 82, as shown in FIG. 2A. Alternatively, the load measuring device may include one or more components that are permanently mounted to or removable from the device 10, e.g., to the upper member 30. For example, a load measuring device may be provided that includes a sensor housing that is permanently mounted to the hook or other structure of the upper member and includes a connector for removably connecting to an exposed end of an earth anchor.

Once the exposed end 92 of an earth anchor 90 is coupled to the hook 60, the drive shaft 40 may be actuated, e.g., using the tool 98 shown in FIG. 3C, to raise the upper member 30 relative to the base plate 12 and, consequently, apply a tensile force between the exposed end 92 and the anchor portion deployed in the ground, e.g., to conduct a load lift (tension) test, with the load cell 92 providing an output measuring the tensile force, e.g., on the display 72. If desired, the device 10 may be pivoted relative to the base plate 12, e.g., while holding the upper handle 62, to facilitate actuation and/or positioning the device 10 relative to the anchor 90 and/or structure 100. Optionally, the base plate 12 may include a notch 12*b* below the hook 60 to facilitate positioning the device 10 more directly over the anchor 90 being tested. For example, the drive shaft 40 may be actuated to raise the upper member 30 and pull the anchor 90 until a desired load is applied to confirm the anchor 90 is properly secured. For example, for solar platform installations, the desired load may be 1.5 times the worst case design load capacity for the structure and/or as otherwise required by the authority holding jurisdiction (AHJ) for the installation site, e.g., as described further in the publications incorporated by reference herein.

Optionally, the load measuring device may include one or more additional components, e.g., within the display 72, to facilitate recording information related to the load tension test, e.g., similar to the devices and systems disclosed in the publications incorporated by reference herein. For example, the load measuring device 80 may simply be a mechanical scale providing an output that may be recorded manually by the operator. Alternatively, the load measuring device 80 and/or display 72 may include a processor and memory for storing the maximum tensile force applied during the load test. Optionally, the load cell measuring device 80 and/or display 72 may include a GPS or other locator device to associate a location, e.g., GPS coordinates with the test results to facilitate identifying the earth anchor being tested, and/or a clock for assigning a date/time to the test results. In addition or alternatively, the load measuring device 80 and/or display 72 may include a communications interface, e.g., a wireless transmitter, for transmitting the test results and any associated data to a remote location, e.g., to a remote computer or other system for storing the data in real-time.

Once the desired load is applied, the device 10 may be removed, e.g., by actuating the drive shaft 40 to lower the upper member 30 and release the tensile force on the exposed 92 end and anchor 90. The exposed end 92 may then be secured to the structure, e.g., secured to one or both of the first leg 102 and its shoe plate 104, e.g., shown in FIGS. 2A and 2B, or to a strut or other component of the structure 100, e.g., to secure the support frame 100 relative to the ground at the installation site. This process may be repeated as desired, e.g., for each of the anchors being used to secure the structure at the site.

Optionally, the device 10 may be used to support a structure after installation, e.g., to allow a support leg or other frame member to be repaired after securing the structure with one or more earth anchors. For example, the support arm 40 of the device 10 may be positioned under a strut or other component of the structure (not shown), and the driveshaft 40 and crank actuated to raise the upper member 30 and, consequently, the support arm 40 until the structure is supported. The frame member may then be repaired and/or replaced, whereupon the crank may be lowered again to release the structure from the support arm 40.

In another option, the device 10 may also be used during installation of an earth anchor itself, e.g., to facilitate removal of a drive rod used to direct the anchor into the ground. For example, the earth anchor may include an anchor portion and a toggle portion pivotally coupled to the anchor portion, the elongate member coupled to the toggle portion, a cable or rod permanently coupled to the anchor portion, and a drive rod removably coupled to the anchor portion. With the toggle portion aligned with the anchor portion, the anchor may be driven into the ground, e.g., by hammering or otherwise forcing the drive rod into the ground with the anchor on the distal end of the drive rod. Once the anchor is positioned at a desired depth and/or location, the exposed end of the drive rod may be coupled to the hook, e.g., using a cable or other connector, and the drive shaft 40 may be actuated to raise the upper member 30 and pull the drive rod from the ground. The toggle portion may then be deployed using conventional methods, leaving the exposed end of the cable and/or rod permanently coupled to the anchor extending from the ground, e.g., for subsequently conducting a load tension test and/or coupling the anchor to the structure being installed.

In another application, the device 10 may be used during installation of a structure, such as a solar platform, including a support frame and a plurality of legs including shoe plates, similar to the frame 100 shown in FIGS. 3A-3C and/or described in the publications incorporated by reference herein. For example, the device 10 may be used to facilitate positioning the legs 102 of the frame 100, e.g., orient the frame 100 at a desired height relative to the ground at the installation site. The base plate 12 of the device may be placed on a shoe plate 104 of a first leg 102 of the structure 100 such that the support arm 40 is located under a support member of the support frame 100, e.g., under a horizontal chassis or strut member, such as the strut 106 shown in FIG. 3C. In an example, the support arm 50 may extend from the upper member 30 to a flange or lip defining a recess having a width greater than the strut. The drive shaft 40 may be activated to raise the upper member 30, e.g., telescopingly sliding the upper member 30 upwards over the lower member 20, thereby engaging the strut 106 with the support arm 50 and raising the support frame 100.

This action may extend the first leg 102, e.g., if the leg 102 includes telescoping components or the operator may adjust the leg 102 themselves. Once a desired height is achieved, the leg 102 may be secured to prevent further movement, e.g., by inserting a drop pin into holes in the leg's telescoping member or engaging another locking mechanism (not shown) to prevent movement of the first leg 102. The device 10 may then be removed, e.g., by actuating the drive shaft 40 to lower the upper member 30, thereby disengaging the strut member from the support arm 50 and allowing the leg 102 to support the structure. This process may be repeated as desired, e.g., for each of the legs of the support frame 100 until the structure is positioned in a desired manner, e.g., with the frame 100 substantially horizontal even if the legs have different lengths once secure due to uneven terrain.

Optionally, the device 10 may be used to raise the structure before placing the base plate of the support legs. For example, the support arm 50 may be coupled to a strut or other component of the structure and the driveshaft 40 and crank actuated to raise the structure 100, e.g., to a level orientation and, if necessary, the soil or other material under the leg 102 and/or base plate may be leveled or otherwise modified before placing the base plate and extending the support leg.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A device for installing and/or testing earth anchors for securing a structure, comprising:
a base plate defining an upper surface;
an elongate first member including a lower end mounted to the upper surface of the base plate along an axis extending from the upper surface;
an elongate second member telescopingly mounted to the first member such that the second member is moveable up and down on the first member along the axis;
an actuator on the second member coupled to a mechanism on one or both of the first and second members to selectively raise the second member up the first member along the axis away from the base plate when the actuator is actuated; and
a testing hook attached to the second member such that the hook moves up along the axis with the second member when the actuator is actuated to raise the second member for conducting a load tension test on an earth anchor coupled to the hook.

2. The device of claim 1, further comprising a load measuring device connectable to the hook, the load measuring device comprising a connector for coupling to an exposed end of an earth anchor installed into the ground to measure a tensile force application to the earth anchor when the actuator is activated to raise the second member and conduct a load tension test.

3. The device of claim 1, wherein the hook is fixed to a sidewall of the second member.

4. The device of claim 1, wherein the actuator comprises a drive shaft extending from an upper end of the second member that is coupled to the mechanism such that rotating the drive shaft in a first direction raises the second member relative to the base plate and rotating the drive shaft in a second direction lowers the second member relative to the base plate.

5. The device of claim 1, wherein the first member is coupled to the base plate by a hinge to adjust an angle of the axis relative to the upper surface of the base plate.

6. The device of claim 5, wherein the base plate includes one or more brackets extending from the upper surface, and wherein a lower end of the first member is connected to the one or more brackets by the hinge.

7. The device of claim 6, wherein the hinge comprises a hole in the one or more brackets stem and corresponding holes lower end, and a pin received in the holes to allow the first member to rotate about a pin axis relative to the base plate.

8. A system for conducting a load tension test on one or more earth anchors used to secure a structure including a support frame and a plurality of legs including shoe plates, comprising:
a load tension device comprising a base plate defining an upper surface, an elongate first member including a lower end mounted to the upper surface of the base plate along an axis extending from the upper surface, an elongate second member telescopingly mounted to the first member such that the second member is moveable up and down on the first member along the axis, an actuator on the second member coupled to a mechanism on one or both of the first and second members to selectively raise the second member up the first member along the axis away from the base plate when the actuator is actuated, and a testing hook attached to the second member such that the hook moves up along the axis with the second member when the actuator is actuated to raise the second member for conducting a load tension test on an earth anchor coupled to the hook; and a load measuring device coupled to the hook, the load measuring device comprising a connector for coupling to an exposed end of an earth anchor installed into the ground to measure a tensile force application to the earth anchor when the actuator is activated to raise the second member and conduct a load tension test.

9. The system of claim 8, wherein the load measuring device comprises one of a load cell and an S beam device.

10. The system of claim 8, further wherein the actuator comprises a hand crank connected to the mechanism to raise the second member up the first member along the axis away from the base plate when the hand crank is actuated.

11. The system of claim 8, further comprising a motorized tool connected to the mechanism to raise the second member up the first member along the axis away from the base plate when the tool is actuated.

12. The system of claim 8, wherein the load measuring device comprises a sensor housing connectable to the hook and an output device for providing a visual indication of the tensile force.

13. The system of claim 12, wherein the output device is connected to the sensor housing by a cable for communicating signals from one or more sensors within the housing to a processor of the output device, or wherein the load cell measuring device comprises one or more wireless transmitters or receivers for communicating signals from one or more sensors within the housing to a processor of the output device.

14. A method for conducting a load tension test on one or more earth anchors used to secure a structure, each earth anchor deployed into the ground adjacent the structure such that an exposed end of the earth anchor extends from the ground, the method comprising:

providing an installation device comprising a base plate defining an upper surface, an elongate first member including a lower end mounted to the base plate along an axis extending from the upper surface, an elongate second member movably mounted to the first member such that the second member is moveable up and down on the first member along the axis, an actuator on the second member coupled to a mechanism on one or both of the first and second members to selectively move the second member along the axis towards or away from the base plate, and a testing hook on the second member for conducting a load tension test on an earth anchor coupled to the hook;

b) placing the base plate adjacent the exposed end;

c) coupling the exposed end to the hook;

d) actuating the actuator to raise the second member and the hook relative to the first member along the axis to apply a desired tensile force between the exposed end and the anchor and conduct a load tension test;

e) removing the device; and f) securing the exposed end to the structure to secure the structure relative to the ground at the installation site.

15. The method of claim 14, wherein removing the device comprises actuating the actuator to lower the second member along the axis, thereby releasing the tensile force.

16. The method of claim 14, further comprising repeating steps a)-f) for each of the legs of the support frame secured by earth anchors.

17. The method of claim 14, wherein installing the earth anchor comprises:

providing an anchor comprising an anchor portion and a toggle portion pivotally coupled to the anchor portion, the elongate member coupled to the toggle portion;

directing the anchor into the ground at the installation site such that the exposed end of the elongate member extends from below the surface to above the ground; and pulling the exposed end to deploy the anchor portion.

18. The method of claim 14, wherein coupling the exposed end to the hook comprises:

connecting a load measuring device to the hook; and connecting the exposed end to the load measuring device, wherein the load measuring device measures the tensile force application.

19. The method of claim 14, wherein a load cell is carried by the hook, and wherein coupling the exposed end to the hook comprises connecting the exposed end to the load cell such that the load cell displays a tensile force applied to the exposed end when the actuator is actuated to raise the second member.

20. The method of claim 19, wherein the load cell records a maximum tensile force applied to the exposed end upon completion of the load tension test.

* * * * *